United States Patent [19]

Kido

[11] Patent Number: 5,977,881
[45] Date of Patent: Nov. 2, 1999

[54] RADIO SELECTIVE CALLING RECEIVER HAVING BATTERY SAVING FUNCTION

[75] Inventor: Toru Kido, Shizuoka, Japan

[73] Assignee: NEC Corporation, Toyko, Japan

[21] Appl. No.: 08/905,045

[22] Filed: Aug. 1, 1997

[30] Foreign Application Priority Data

Aug. 1, 1996 [JP] Japan ..................................... 8-203958
Aug. 15, 1996 [JP] Japan ..................................... 8-215697

[51] Int. Cl.$^6$ ................................................. G08B 5/22
[52] U.S. Cl. ................................... 340/825.44; 455/38.1; 455/226.1; 455/226.4; 455/343
[58] Field of Search ........................... 340/825.44, 311.1, 340/825.21, 825.47, 825.48, 825.49, 825.36; 455/38.1, 38.2, 38.3, 161.2, 166.1, 226.2, 343, 226.4, 229, 67.7

[56] References Cited

U.S. PATENT DOCUMENTS 5,193,216  3/1993  Davis ................................. 340/825.49
5,682,147  10/1997  Eaton et al. ....................... 340/825.44

FOREIGN PATENT DOCUMENTS 4304043   10/1991  Japan.
4-304043  10/1992  Japan.
6-315001  11/1994  Japan.
6315001   11/1994  Japan.
WO 94/14286  6/1994  WIPO.

Primary Examiner—Michael Horabik
Assistant Examiner—Jean Bruner Jeanglaude
Attorney, Agent, or Firm—Young & Thompson

[57] ABSTRACT

A radio selective calling receiver has a function of causing a reception section for receiving a transmitted radio signal to intermittently receive the radio signal by intermittently supplying a reception section power supply ON signal for turning on the reception section. The radio selective calling receiver detects the movement of the receiver out of a coverage zone on the basis of data indicating that the radio signal received by the reception section contains no sync signals having a predetermined period. The receiver then determines the state of movement out of the coverage zone on the basis of a received state of the sync signals within a predetermined period of time in the past until the movement of the receiver out of the coverage zone is detected, and controls the time intervals at which the reception section power supply ON signal is supplied to the reception section in accordance with the determined state.

12 Claims, 11 Drawing Sheets

RADIO SELECTIVE CALLING RECEIVER HAVING BATTERY SAVING FUNCTION

BACKGROUND OF THE INVENTION

1. Field of the Invention

The present invention relates to a radio selective calling receiver and, more particularly, to a radio selective calling receiver having a battery saving function. The present invention also relates to a scanning type radio selective calling receiver.

2. Description of the Prior Art

In a radio selective calling receiver using a battery as a power supply, to prolong the service life of the battery, the power consumed by the reception section must be suppressed low. In addition, if a large-capacity battery is used, the overall radio selective calling receiver increases in size. For this reason, to reduce the size of the compact radio selective calling receiver, it is important to reduce the power consumption of the reception section.

Under the circumstances, in a general radio selective calling receiver, battery saving (to be referred to as BS hereinafter) control is performed such that the reception section is not always operated but is intermittently operated at predetermined time intervals to suppress the power consumption of the reception section low.

To suppress the power consumption of the reception section low, it is desired that the reception section be intermittently operated at long time intervals. However, excessively long time intervals increase the probability that the radio selective calling receiver fails to receive a radio signal which should be received. As a result, the reception function of the radio selective calling receiver may be impaired. For this reason, BS control in a general radio selective calling receiver is performed such that the reception section is intermittently operated at time intervals which are set to ensure the reception function.

Such BS control may be effective while the radio selective calling receiver is in the coverage zone in which radio signals can be received. If, however, the reception section is intermittently operated at such short time intervals even while the radio selective calling receiver stays in an area, outside the coverage zone, in which no radio signals arrive at the receiver, the power is wasted.

The radio selective calling receiver disclosed in Japanese Unexamined Patent Publication No. 4-304043 has been proposed as a means for solving such a problem. This radio selective calling receiver is designed to detect whether a sync signal is received. On the basis of this detection, it is checked whether the receiver is in the coverage zone. Upon detecting the movement of the radio selective calling receiver out of the coverage zone, the receiver switches the BS control modes to reduce the power consumption of the reception section. More specifically, when this radio selective calling receiver moves out of the coverage zone, the receiver starts counting a period of time that elapses upon moving out of the coverage zone. The reception section is intermittently operated at first time intervals which are relatively short time intervals until this elapsed time reaches a predetermined time A. After the elapsed time exceeds the predetermined time A, the reception section is intermittently operated at second time intervals which are longer than the first time intervals.

According to this radio selective calling receiver, since intermittent reception is performed at short time intervals when the time period of a stay outside the coverage zone is shorter than the predetermined time A, even a call signal that arrives immediately after the receiver returns to the coverage zone can be quickly received. If the time period during which the receiver stayed outside the coverage zone is longer than the predetermined time A, the time intervals of intermittent reception are switched to the long time intervals. With this operation, the power consumption of the reception section can be suppressed low, and hence the service life of the battery can be prolonged.

In the above conventional radio selective calling receiver, movement of the receiver out of the coverage zone is detected when no sync signal is received, and the time intervals of intermittent reception are uniformly prolonged. According to this BS control, a problem may be caused in performing synchronization establishment when the receiver returns to the coverage zone depending on the time intervals of intermittent reception after the movement of the receiver out of the coverage zone. This problem will be described below.

Consider two cases in which the radio selective calling receiver moves out of the coverage zone: the first case in which the receiver moves out of the transmission area in which radio waves transmitted from a transmitting station can be received; and the second case in which the receiver enters a place, e.g., a subway or a building, within the transmission area, in which radio waves are blocked.

In the first case, an abrupt operation for restoration to the coverage zone is rarely required. No problem is therefore posed even if the time intervals of intermittent reception outside the coverage zone are prolonged to a certain extent. In contrast to this, in the second case, quick restoration to the coverage zone and synchronization establishment for this purpose are required immediately after the blocked state of radio waves is canceled. If, therefore, the time intervals of intermittent reception outside the coverage zone are prolonged, such quick synchronization establishment is difficult to perform.

In the above conventional radio selective calling receiver, however, the time intervals of intermittent reception are uniformly switched without checking whether the movement of the receiver out of the coverage zone corresponds to the first or second case. For this reason, if priority is given to a reduction in power consumption by prolonging the timer intervals, a problem may be posed in quick synchronization establishment for restoration to the coverage zone. To prevent this problem, the time intervals of intermittent reception outside the coverage zone need to be shortened. If, however, the time intervals are shortened, the power consumption cannot be sufficiently reduced.

Demands have recently arisen for a receiver to which a plurality of frequencies at which a self-call number is transmitted are assigned in advance (to be referred to as a scanning receiver hereinafter). This type of receiver is used as a multi-area receiver which can automatically switch a plurality of areas with different frequencies. According to this receiver, since a plurality of frequencies at which the self-call number is transmitted are assigned to the receiver, the receiver searches for a sync signal in a transmission signal to be received while sequentially scanning the assigned frequencies when the receiver is outside the coverage zone.

Upon reception of the sync signal, the receiver stops scanning the frequencies, and locks the frequency to the above frequency. As a result, the receiver is set in the state in which a self-call signal can be received, i.e., the coverage-zone state. In the coverage-zone state, the frequency is kept fixed until a condition for determination of movement out of the coverage zone is satisfied. According to the scanning receiver, automatic multi-area selection is realized as follows. In the coverage-zone state, a frequency is fixed. When the receiver moves out of the coverage zone, synchronization with a transmission signal, which has been established in the coverage-zone state, is canceled, and a sync signal is detected while the frequencies are switched.

According to such automatic multi-area selection, for example, in the receiver disclosed in Japanese Unexamined Patent Publication No. 06-315001, in the out-of-coverage-zone state, frequency scanning is performed a predetermined number of times according to a predetermined pattern. If no sync signal is detected, frequency scanning is performed again according to the above pattern after a lapse of a predetermined period of time. A general condition of determination of movement out of the coverage zone is that no sync signal is consecutively received a predetermined number of times at the sync signal transmission timings in the coverage-zone state.

In such a conventional radio selective calling receiver as a scanning receiver, since a plurality of frequencies cannot be simultaneously received, the intervals at which a sync signal is detected at a specific frequency are prolonged in proportion to the number of scanning frequencies. That is, as the number of frequencies to be detected increases, detection of a sync signal delays even if the receiver is in the signal transmission area, and a longer period of time is required for a shift from the out-of-coverage-zone mode to the coverage-zone mode.

If the number of times of detection of a sync signal is simply increased, the BS effect deteriorates in the out-of-coverage-zone state although a detecting operation is performed at short intervals.

In the first case in which the above out-of-coverage-zone state is established, priority should be given to the BS effect. In the second case, synchronization must be quickly established. In contrast to this, in the conventional radio selective calling receiver disclosed in Japanese Unexamined Patent Publication No. 6-315001, predetermined BS control is performed after the receiver moves out of the coverage zone regardless of the immediately preceding reception state in the coverage zone. That is, the above two cases are not discriminated. For this reason, if priority is given to the BS effect, synchronization establishment delays. If priority is given to synchronization establishment, the BS effect in the out-of-coverage-zone state deteriorates.

SUMMARY OF THE INVENTION

The present invention has been made in consideration of the above situation, and has as its object to provide a radio selective calling receiver which can control the time intervals at which a reception section is intermittently operated upon moving the receiver out of a coverage zone in accordance with the state of the movement of the receiver out of the coverage zone by determining the state of the movement of the receiver out of the coverage zone, can reduce the power consumption in frequency scanning, and can satisfy both the requirements for quick synchronization establishment required for the restoration of the receiver to the coverage zone and for a reduction in power consumption.

To solve the above problem, the radio selective calling receiver must have a means for detecting the state of the movement of the receiver out of the coverage zone. From studies on this means, the present inventor concluded that the use of the following phenomena was effective in solving the above problem.

a. When the radio selective calling receiver moves into a radio wave blocking area such as a subway, an abrupt shift occurs from a state in which sync signals are received to a state in which no sync signals are consecutively received.

b. When the radio selective calling receiver moves out of the transmission area, the frequency with which no sync signal is received gradually increases. Finally, this state shifts to a state in which no sync signals are consecutively received.

According to the following aspects of the present invention, the state of the movement of the radio selective calling receiver out of the coverage zone is identified by using such phenomena, and the reception section is intermittently operated at time intervals suitable for the identified state.

In order to achieve the above object, according to the first basic aspect of the present invention, there is provided a radio selective calling receiver having a function of causing a reception section for receiving a transmitted radio signal to intermittently receive the radio signal by intermittently supplying a reception section power supply ON signal for turning on the reception section, wherein the radio selective calling receiver detect, movement of the receiver out of a coverage zone on the basis of data indicating that the radio signal received by the reception section contains no sync signals having a predetermined period, determines a state of movement out of the coverage zone on the basis of a received state of the sync signals within a predetermined period of time in the past until the movement of the receiver out of the coverage zone is detected, and controls time intervals at which the reception section power supply ON signal is supplied to the reception section in accordance with the determined state.

In order to achieve the above object, according to the second basic aspect of the present invention, there is provided a radio selective calling receiver comprising:

a reception section to which a power supply ON signal is intermittently supplied and which receives and demodulates a transmitted radio signal;

sync signal detection means for detecting a sync signal having a predetermined period and contained in the radio signal from an output signal from the reception section;

out-of-coverage-zone movement monitoring means for detecting movement of the radio selective calling receiver out of a coverage zone on the basis of a sync signal detection signal generated by the sync signal detection means;

history holding means for holding history data indicating whether a sync signal was detected by the sync signal detection means when the power ON signal was supplied to the reception section a predetermined number of times in the past; and reception control means for controlling time intervals at which the power ON signal is intermittently supplied to the reception section on the basis of the history data held in the history holding means when the out-of-coverage-zone movement monitoring means detects movement of the radio selective calling receiver out of the coverage zone.

According to the second basic aspect, the reception control means intermittently supplies the power ON signal at first time intervals when the number of times the sync signal was not detected within a predetermined period of time in the past is less than a predetermined number of times, and intermittently supplies the power ON signal to the reception section at second time intervals longer than the first time intervals when the number of times the sync signal was not detected is not less than the predetermined number of times.

According to the second aspect, the reception control means intermittently supplies the power ON signal to the reception section at the first time intervals when the reception control means intermittently supplies the power ON signal to the reception section at the first time intervals for a predetermined period of time after the radio selective calling receiver moves out of the coverage zone.

According to the second basic aspect, the out-of-coverage-zone movement monitoring means determines that the radio selective calling receiver is in the coverage zone, when the sync signal detection signal is output, and determines that the radio selective calling receiver has moved out of the coverage zone, when the sync signal detection signal is not consecutively output a predetermined number of times.

In order to achieve the above object, according to the third basic aspect of the present invention, the radio selective calling receiver is a scanning type radio selective calling receiver which is locked to a frequency channel from which the sync signal is detected while a plurality of different predetermined frequency channels are sequentially switched, receives a radio signal subsequently transmitted and constituted by a self-call number and data, and performs a calling/notifying operation.

In order to achieve the above object, according to the fourth basic aspect of the present invention, the receiver further comprises:

- a reception section for receiving and demodulating the radio signal, the reception section being capable of receiving activation control;
- sync signal detection means for detecting a sync signal having a predetermined period and contained in the radio signal from an output signal from the reception section;
- out-of-coverage-zone movement monitoring means for detecting on the basis of the sync signal detection signal whether the radio selective calling receiver has moved out of a coverage zone in which the radio signal can be received;
- history holding means for holding history data indicating whether the sync signal was detected by the sync signal detection means within the unit number of times the reception section is activated; and
- a reception control section for, when the out-of-coverage-zone movement monitoring means determines that the radio selective calling receiver has moved out of the coverage zone, searching for the sync signal without switching the frequency channels in an out-of-coverage-zone state, if the number of times the sync signal was not detected is less than a predetermined number of times within the unit number of times the reception section was activated, and searching for the sync signal while performing a predetermined switching operation for the frequency channels, if the number of times the sync signal was not detected is not less than a predetermined number of times.

According to the fourth basic aspect, the out-of-coverage-zone movement monitoring means determines that the radio selective calling receiver is in the coverage zone, when the sync signal detection signal is output, and determines that the radio selective calling receiver has moved out of the coverage zone, when the sync signal detection signal is not consecutively output a predetermined number of times.

According to the fourth basic aspect, the reception control section searches for the sync signal without switching the frequency channels for a predetermined period of time when the radio selective calling receiver is outside the coverage zone, and searches for the sync signal while performing a predetermined switching operation for the frequency channels after a lapse of the predetermined period of time.

According to the fourth basic aspect, the radio selective calling receiver further comprises external input means for, when the radio selective calling receiver has moved out of the coverage zone, selectively causing the reception control section to search for the sync signal without switching the frequency channels or to search for the sync signal while performing a predetermined switching operation for the frequency channels in accordance with sync signal detection history data held in the history holding section, and a memory for holding the selection result obtained by the external input means.

According to the present invention having the above aspects, the time intervals at which the reception section is intermittently operated upon moving out of the coverage zone can be controlled in accordance with the state of the movement of the receiver out of the coverage zone, and both the requirements for quick synchronization establishment required for the restoration of the receiver to the coverage zone and for a reduction in power consumption can be satisfied.

According to the present invention, the cause of the determination of the movement of the receiver out of the coverage zone is determined from data representing the presence/absence of sync signals in the coverage zone immediately before the receiver moves out of the coverage zone. With this determination processing, the power consumption in a frequency scanning operation can be reduced, and synchronization establishment in the coverage zone can be quickly performed when the receiver returns to the coverage zone.

According to the present invention, the out-of-coverage-zone movement means determines that the self-receiver is in the coverage zone, when the sync signal is detected. When the sync signal cannot be consecutively received a predetermined number of times, the out-of-coverage-zone movement means determines that the self-receiver is outside the coverage zone. With this arrangement, whether the self-receiver is currently inside or outside the coverage zone can be accurately and quickly detected from data representing the presence/absence of sync signals.

According to the present invention, when the self-receiver is outside the coverage zone, the reception control section searches for the sync signal for a predetermined period of time without switching the frequency channels. After a lapse of the predetermined period of time, the reception control section searches for the sync signal while performing a predetermined switching operation for the frequency channels. With this arrangement, since a search for the sync signal is sequentially performed in the order of given frequency channels for a predetermined period of time after the receiver moves out of the coverage zone, e.g., after the receiver moves to an area of another frequency channel by subway, synchronization establishment in the coverage zone can be reliably performed upon moving the receiver out of the coverage zone.

According to the present invention, the receiver includes the external input means for, when the self-receiver has moved out of the coverage zone, selectively causing the reception control section to search for the sync signal without switching the frequency channels or to search for the sync signal while performing a predetermined switching operation for the frequency channels in accordance with sync signal detection history data held in the history holding section, and the memory for holding the selection result obtained by the external input means. With this arrangement, upon input operation of the external input means, it can be quickly and easily checked whether the self-receiver has moved into a radio wave blocking area or moved out of the transmission area.

The above and many other objects, features and advantages of the present invention will become manifest to those skilled in the art upon making reference to the following description and accompanying drawings in which preferred embodiments incorporating the principles of the present invention are shown by way of illustrative example.

BRIEF DESCRIPTION OF THE DRAWINGS

FIGS. 8A and 8B are views showing signal formats in which FIG. 8A is in case a radio selective calling receiver has temporarily moved into the radio wave blocking area and FIG. 8B is in case the receiver has moved out of the the coverage zone;

DETAILED DESCRIPTION OF THE PREFERRED EMBODIMENTS

A preferred embodiment of the present invention will be described below with reference to the accompanying drawings.

Figure 1:
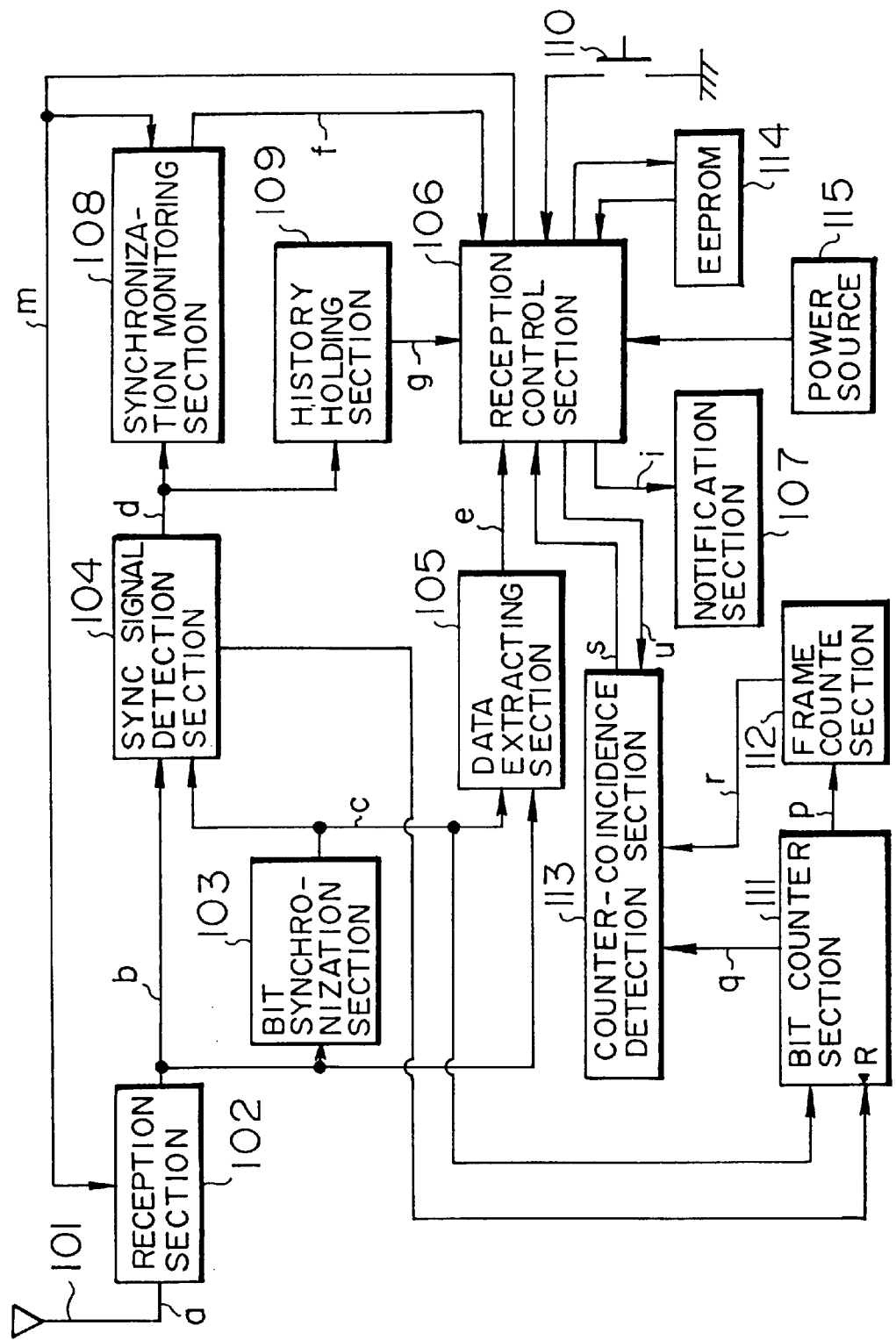
FIG. 1 is a block diagram showing an arrangement of a radio selective calling receiver according to an embodiment of the present invention.
Figure 2:
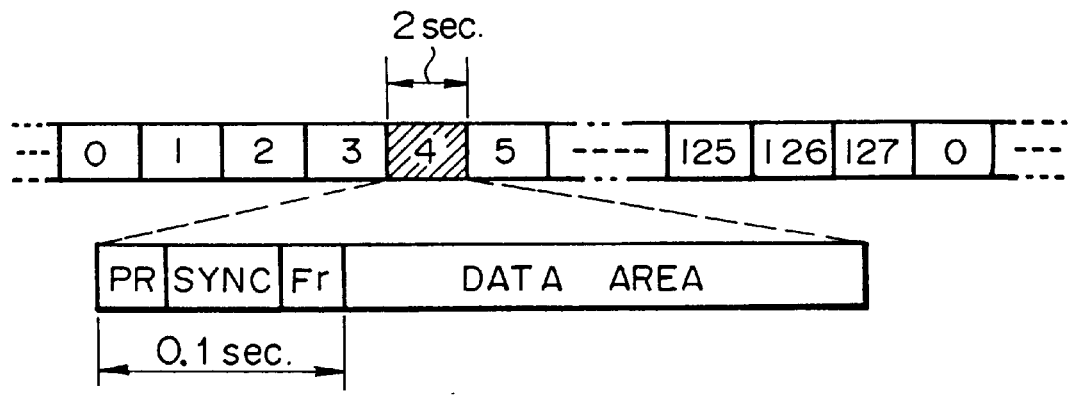
FIG. 2 is a view showing a signal format of a radio signal.

FIG. 1 is a block diagram showing the arrangement of a radio selective calling receiver according to an embodiment of the present invention. Referring to FIG. 1, an antenna 101 receives a radio signal a transmitted from a radio base station (not shown). A signal format of synchronous system shown in FIG. 2 is one embodiment of the radio signal a. As shown in FIG. 2, the radio signal a consists of a preamble signal PR for attaining a bit synchronization, a synchronizing signal SYNC for attaining a word synchronization, a frame signal Fr indicating a frame No. of a transmitted frame, and a data area including an access ID, a message, etc. As regards the length of the signals, for example, a total length of signals PR, SYNC and Fr is 0.1 second and, on the other hand, the length of one frame is 2 seconds. In addition, in this system, it is established that only a predeterminedly assigned frame or frames can be received by a receiver (not shown) in the reception section 102. The operation of a reception section 102 is controlled by a BS control signal (reception section power supply ON signal) m outputted from a power supply control section 110 to demodulate the radio signal a received through the antenna 101, amplify it, and output a demodulated signal b.

A bit synchronization section 103 generates a data sampling reproduction clock c by using a reference clock from an oscillation circuit (not shown) and the modulated signal b. A data extracting section 105 outputs a reception data signal e to a reception control section 106 in accordance with the reproduction clock c and the modulated signal b. If the received reception data signal e contains a self-call number, the reception control section 106 issues a signal i and notifies the user of the incoming call through a notification section 107. As another case, the notification section 107 can be controlled through a certain interface unit by the data extracting section 105. In addition, the reception control section 106 checks on the basis of outputs f and g from a synchronization monitoring section 108 and a history holding section 109, respectively, whether the self-receiver has moved into a radio wave blocking area or moved out of the transmission area.

A sync signal detection section 104 samples the modulated signal b from the reception section 102 in accordance with the reproduction clock c, detects a sync signal pattern, and supplies a sync signal detection signal d representing the detection result to the synchronization monitoring section 108 and the history holding section 109.

In addition, as a timer count apparatus in the reception control section 106, there are further provided in this embodiment a bit counter section 111 to which the data sampling reproduction clock c from the bit synchronization section 103 as a counter source is inputted so as to conduct a counting operation in accordance with the formation of a signal format and also the sync signal detection signal d from the sync signal detection section 104 is inputted for presetting the bit counter section 111, thereby attaining a synchronization with the transmitted radio signal, a frame counter section 112 to which an output p from the bit counter section 111 is inputted, a counter-coincidence detecting section 113 to which outputs q and r from the bit counter section 111 and the frame counter section 112, respectively, are inputted and from which an output s is issued to the reception control section 106, and an electrically erasable and programmable read-only memory (simply referred hereinafter to an EEPROM) 114 in which frame No. to be received by the reception section 102 and other predetermined instruction data are previously stored and from which these data can be erased by the action of the reception control section 106.

The synchronization monitoring section 108 monitors the detection result on a sync signal when the power supply for the reception section 102 is ON on the basis of the reception section power supply ON signal m outputted from the reception control section 106, and outputs a coverage-zone/ out-of-coverage-zone detection signal f on the basis of the monitoring result. More specifically, if a sync signal is detected when the power supply for the reception section 102 is ON, the synchronization monitoring section 108 detects the coverage-zone/out-of-coverage-zone detection signal f indicating that the self-receiver is in the coverage zone. If a state in which no sync signal is detected when the power supply for the reception section 102 is ON consecutively occurs N times (for example, 5 times), the synchronization monitoring section 108 outputs the coverage-zone/out-of-coverage-zone detection signal f indicating that the self-receiver is outside the coverage zone. In this case, N is a predetermined value which is used as a parameter for setting a condition for determination of movement out of the coverage zone.

Figure 3:
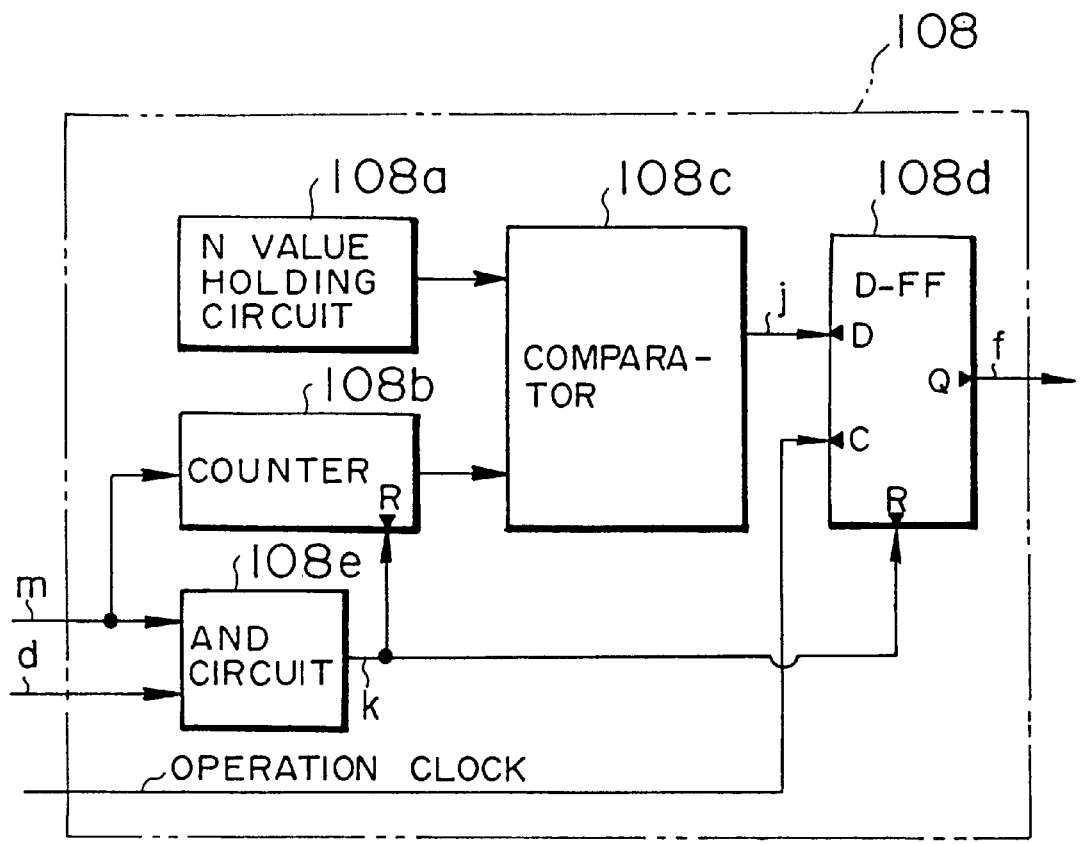
FIG. 3 is a block diagram showing an arrangement of a synchronization monitoring section in the embodiment shown in FIG. 1.

FIG. 3 shows an arrangement of the synchronization monitoring section 108. As shown in FIG. 3, the synchronization monitoring section 108 comprises: an N value holding circuit 108a; a counter 108b consisting of a T-flip flop (T-FF) for counting the N value in which a reference character R represents a reset terminal; a comparator 108c for comparing the N value outputted from the N value holding circuit 108a with that issued from the counter 108b in each bit and issuing a coincidence detecting signal j of a high level (Hi) when all bits have coincided with one another; a D-flip flop (D-FF) 108d in which D represents a data input terminal, C a clock terminal, Q an output terminal, and R a reset terminal; and an AND circuit 108e.

In thus arranged synchronization monitoring section 108, the coincidence detecting signal j is latched by the D-flip flop 108d. The D-flip flop 108d outputs the coverage-zone/out-of-coverage-zone detection signal f in which a coverage-zone condition is recognized when the signal f is in a low level (Lo) and, on the other hand, an out-of-coverage-zone condition is recognized when the signal f is in a high level (hi). Further, both the counter 108c and the D-flip flop 108d are reset by an AND output (a reset signal) k. In other words, the counter 108b is reset in a zero count condition by the the reset signal k which is an AND output issued by the input of both the reception section power supply signal m and the sync signal detection signal d. On the other hand, the signal f outputted from the D-flip flop 108d is cleared in a low level (Lo) by the AND output k.

Figure 4:
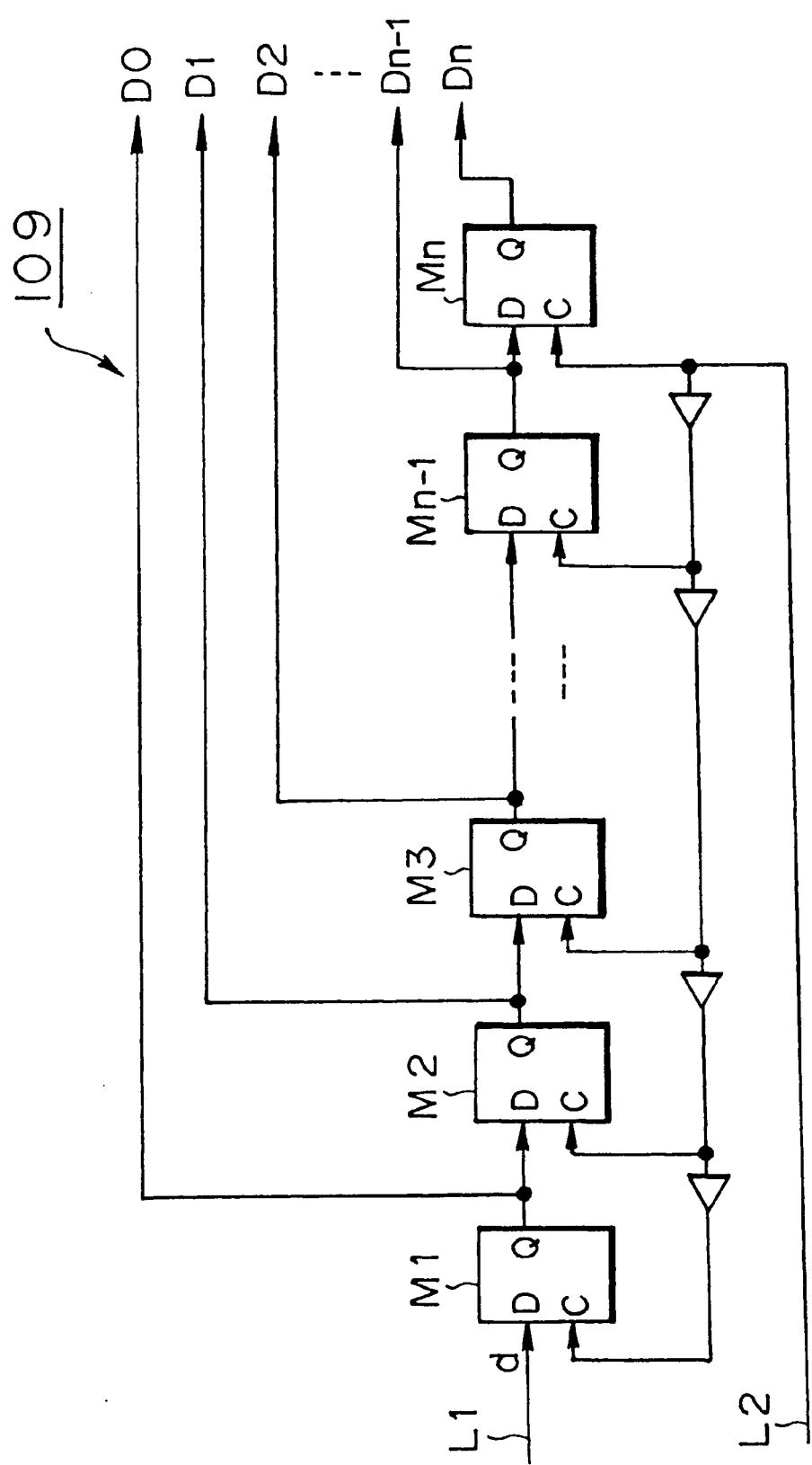
FIG. 4 is a block diagram showing an arrangement of a history holding section in the embodiment shown in FIG. 1.
Figure 5:
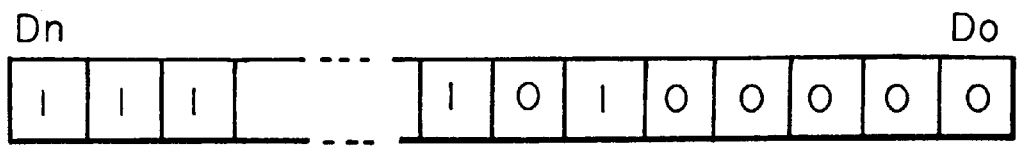
FIG. 5 is a view showing a signal format of history data in the history holding section shown in FIG. 4.

The history holding section 109 holds n data, each indicating the presence/absence of a sync signal detected by the sync signal detection section 104, in a reverse chronological order, starting from the latest data. In this case, n is set to satisfy at least n>N. FIG. 4 shows an arrangement of the history holding section 109. Reference symbol L1 denotes a signal line through which a signal outputted from the sync signal detection section 104 is sent. When this output signal is at high level "H", it indicates that a sync signal is detected. When the output signal is at low level "L", it indicates that no sync signal is detected. Reference symbol L2 denotes a signal line through which a pulse signal is input. In response to the leading edge of this pulse signal, data indicating the presence/absence of a sync signal which is represented by the above output signal is latched. Referring to FIG. 4, reference symbols M1 to Mn denote flip-flops. When the input signal level of a clock terminal C of each flip-flop rises, input data to a data input terminal D is received and output from an output terminal Q. In the case shown in FIG. 4, the history holding section 109 is constituted by a shift register having these n flip-flops M1 to Mn cascaded to each other. The detection signal d outputted from the sync signal detection section 104 is inputted to the data input terminal D of the first flip-flop through the signal line L1. A pulse signal is input to the clock terminal C of each of the flip-flops M1 to Mn through the signal line L2. The detection signal d is written in the first flip-flop and shifted to the subsequent stages of the shift register at the leading edge of this pulse signal. This shift register holds n detection history data on sync signals in the reverse chronological order starting from the latest data. Subsequently, n-bit history data, each bit representing the presence/absence of a sync signal, obtained by performing detection n times in the past, are outputted to output signal lines D0 to Dn connected to the respective stages of the shift register. FIG. 5 shows the signal format of the n-bit history data outputted to the output signal lines D0 to Dn in this manner. Referring to FIG. 5, each bit "1" represents that a sync signal was detected, whereas each bit "0" represents that no sync signal was detected. With this operation, the reception history data on sync signals, which were obtained by performing detection n times in the past, are read out.

The reception control section 106 controls supply of the power supply ON signal m to the reception section 102 in accordance with the outputs f and g from the synchronization monitoring section 108 and the history holding section 109.

This control operation is as described hereinafter. When a signal u of the frame No. to be received at the reception section 102 which is previously set in the EEPROM 114 is outputted from the reception control section 106 to the counter coincidence detection section 113, the collating operation whether the signal u coincides with the frame counter signal r issued from the frame counter section or not. As a result, if the signal (coincidence signal) s is outputted from the counter-coincidence detection section 113 to the reception control section 106, the reception control section 106 outputs the power supply ON signal m, which is a high level signal, so as to make the reception section 102 an operative state. And then, after completion of the reception of the predetermined frame or frames, a power supply OFF signal which is a low level signal is outputted from the reception control section 106 so as to make the reception section 102 an inoperative state.

Reference numeral 110 denotes a push switch serving as an external input means for giving an instruction to check whether the radio selective calling receiver has moved into a radio wave blocking area or moved out of the transmission area; and 115, a power supply for supplying power to the respective components of the radio selective calling receiver.

The operation of the radio selective calling receiver will be described next. First of all, the antenna 101 receives a radio signal a from the radio base station (not shown). The reception section 102 then amplifies and demodulates the radio signal a received through the antenna 101, and outputs a demodulated signal b. The bit synchronization section 103 generates a data sampling regeneration clock c by using a reference clock from an oscillation circuit (not shown) and the demodulated signal b. The data extracting section 105 samples the demodulated signal b from the regeneration signal c, and outputs reception data e to the reception control section 106. If the received reception data e contains the self-call number, the reception control section 106 outputs a display signal, a sound signal i, or the like to the notification section 107. Upon reception of this signal, the notification section 107 performs, for example, a display operation or generates a sound to inform the user of the incoming call.

The radio selective calling receiver of the present invention performs the above call notifying operation, and at the same time, performs the following BS control operation.

Figure 6:
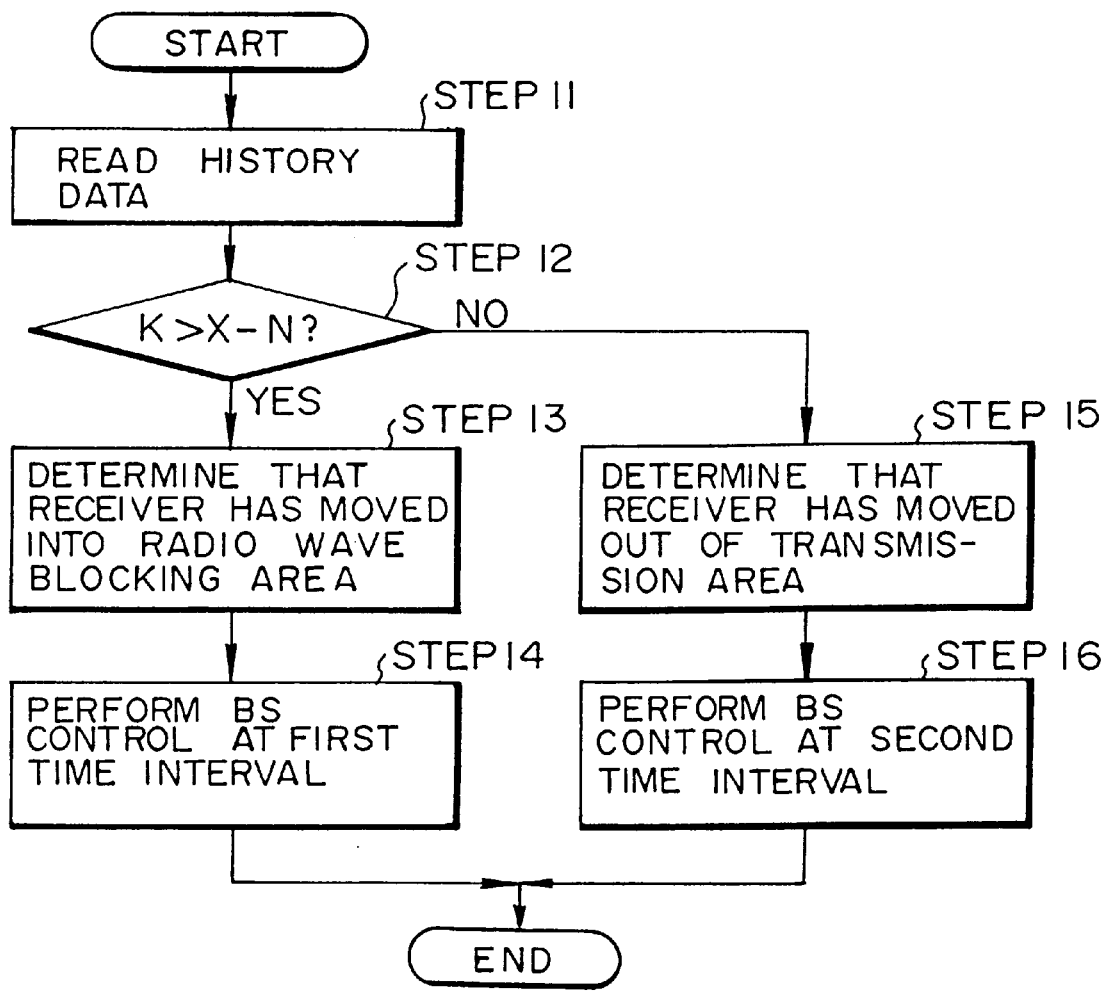
FIG. 6 is a flow chart showing an operation in the embodiment shown in FIG. 1.

The reception control section 106 always monitors the coverage-zone/out-of-coverage-zone detection signal f output from the synchronization monitoring section 108. When the reception control section 106 detects, on the basis of this coverage-zone/out-of-coverage-zone detection signal f, that the radio selective calling receiver has moved out of the coverage zone, the control section 106 executes the routine shown in the flow chart of FIG. 6. First of all, the reception control section 106 reads out the history data representing the presence/absence of sync signals, obtained until the receiver has moved out of the coverage zone, from the history holding section 109 (step 11). The reception control section 106 then counts the number of times (X) no sync signal was detected in the detecting operation performed n times in the past, calculates X–N, and compares the resultant value with a parameter K which is preset as a criterion for determination of movement out of the coverage zone (step 12). If K>X–N, since it is assumed that the reception section abruptly stopped receiving sync signals, the reception control section 106 determines that the radio selective calling receiver has temporarily moved into a radio wave blocking area (step 13). The reception control section 106 therefore sends the reception section power supply ON signal m at first time intervals preset for the reception section 102, and performs a BS control operation at the first timer intervals (step 14).

If it is determined in step 12 that K≦X–N, since it is assumed that the reception section gradually stopped receiving sync signals, the reception control section 106 determines that the radio selective calling receiver has moved out of the transmission area (coverage zone) (step 15). The reception control section 106 therefore sends the reception section power supply ON signal m to the reception section 102 at second timer intervals longer than the first time intervals, and performs a BS control operation at the second time intervals.

Figure 7:
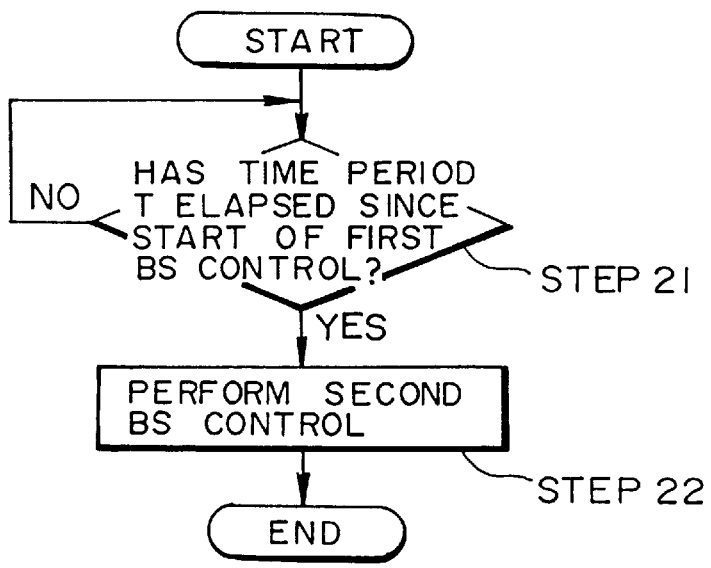
FIG. 7 is a flow chart showing a routine for BS control in the embodiment shown in FIG. 1.

When the reception control section 106 starts a BS control operation based on the first time intervals, the routine shown in the flow chart of FIG. 7 is executed. First of all, the reception control section 106 checks whether a predetermined time period T has elapsed since the BS control operation based on the first time intervals was started (step 21). When the predetermined time period T has elapsed, the reception control section 106 starts a BS control based on the second time intervals (step 22).

Figure 8A:
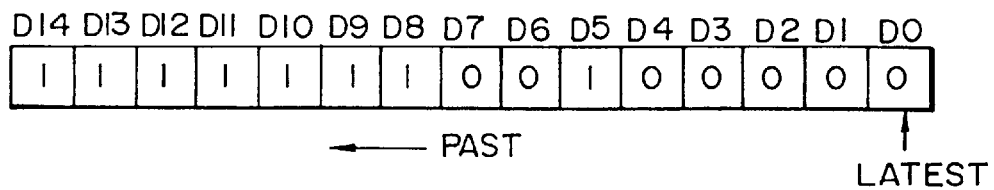
Figure 8:
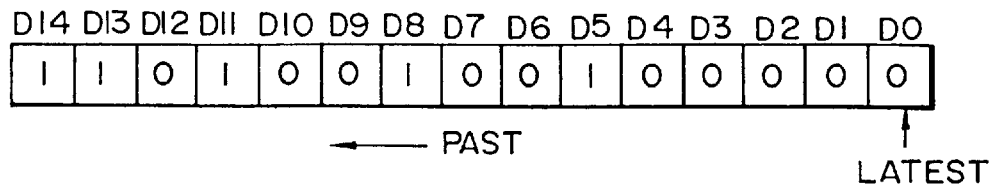

Next, with reference to FIGS. 8A and 8B, two examples of the cases, one of which is the case where the radio selective calling receiver has temporarily moved into a radio wave blocking area and the other of which is the case where the radio selective calling receiver has moved out of the transmission area (coverage zone), are explained in detail. In these examples, the history holding section 109 has the following parameters:

N . . . 5 times;
n . . . 15 times; and
K . . . 3 times.

First, the case where the radio selective calling receiver has temporarily moved into the radio wave blocking area is explained with reference to FIG. 8A. Between D14 to D5 (which refer to FIG. 4), the number of generation times of the "0" bit, which denotes the condition where no sync signal was detected, is remarkably less than that of the "1" bit, which represents the condition where the sync signal was detected. This case shown in FIG. 8A can suspect that the radio selective calling receiver has moved suddenly into a radio wave blocking area where the transmitted radio waves are hardly received or blocked such as, for example, a place within subway or building. On the other hand, between D4 to D0, the number of generation times of "0" bit are continuously 5 times which indicates the fact that the radio selective calling receiver has moved out of the coverage zone of radio waves. In total between D14 to D0 in FIG. 8A, it can be understood that the radio selective calling device has temporarily moved into the radio wave blocking area, because the value of X–N (7–5) is 2 which is less than the value of K.

Second, the case where the radio selective calling receiver has moved out of the transmission area (coverage zone of radio waves) is explained with reference to FIG. 8B. Between D14 to D5, the number of generation times of the "0" bit is relatively frequent more than that of the "1" bits. This case shown in FIG. 8B can presume the circumstances that the radio selective calling receiver has moved gradually into an area where the transmitted radio waves are hardly received. On the other hand, the number of generation times of the "0" bit between D4 to D0 are continuously 5 times which indicates the condition where the radio selective calling receiver has moved out of the coverage zone of radio waves. In total between D14 to D0 in FIG. 8B, it can be understood that the radio selective calling device has moved out of the caverage zone of radio waves, because the value of X–N (10–5) is 5 which is more than the value of K.

Figure 9:
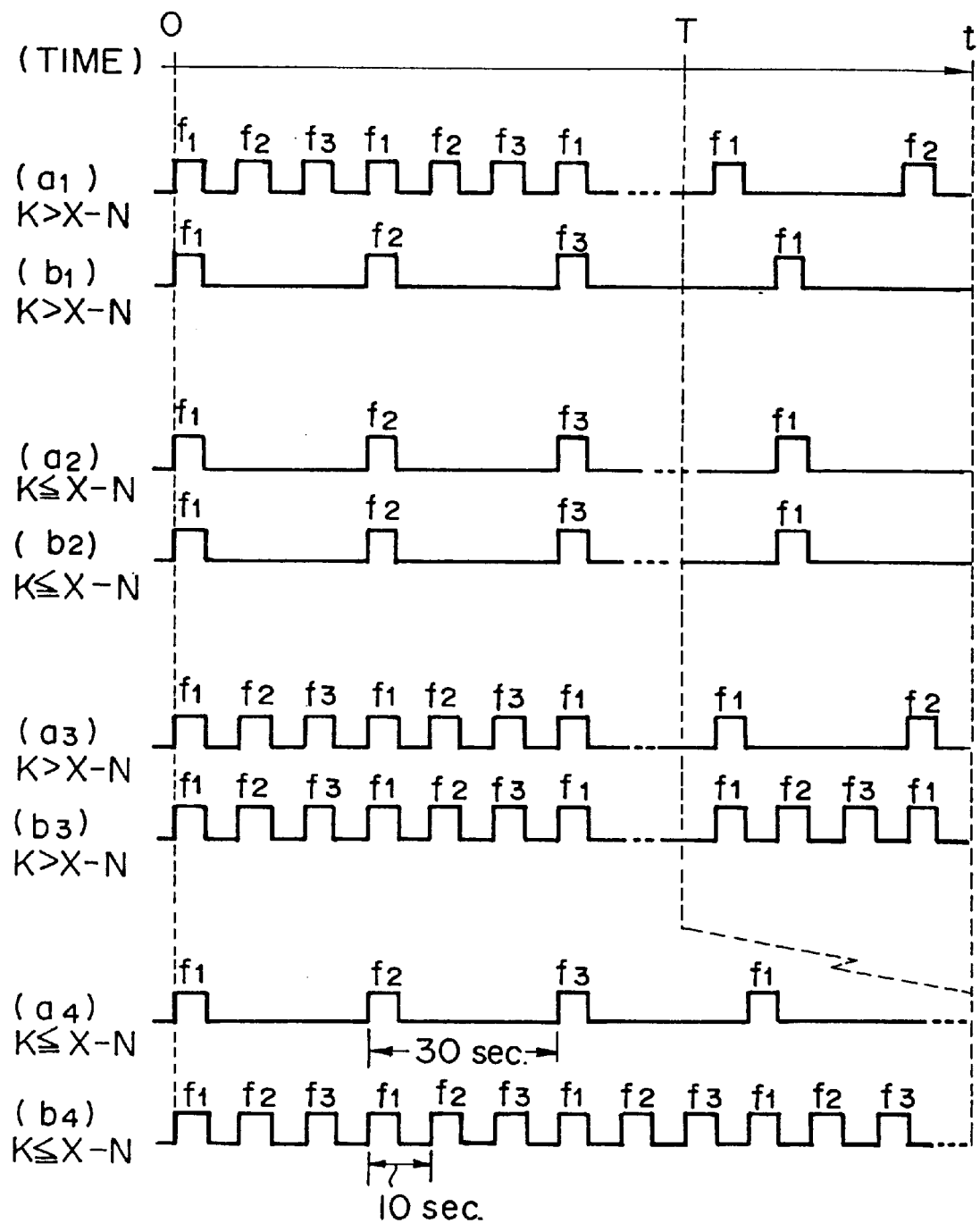
FIG. 9 is a timing chart for explaining BS control performed in the embodiment of the present invention in comparison with the prior art.

A BS control operation to be performed in this embodiment will be described next with reference to FIG. 9, in comparison with the prior art. Referring to FIG. 9, reference symbol t denotes an elapsed time from the movement of the radio selective calling receiver out of the coverage zone.

Referring to FIG. 9, "$(a_1)$" shows the waveform of the reception section power supply ON signal m when it is determined in step 12 that K>X–N, and in this case it is determined that the radio selective calling receiver has moved into a radio wave blocking area, and "$(b_1)$" shows the waveform of the reception section power supply ON signal m in the conventional radio selective calling receiver under the same conditions.

Referring to FIG. 9, "$(a_2)$" shows the waveform of the reception section power supply ON signal m when it is determined in step 12 that K≦X–N, and in this case it is determined that the radio selective calling receiver has moved out of the transmission area (coverage zone), and "$(b_2)$" shows the waveform of the reception section power supply ON signal m in the conventional radio selective calling receiver under the same conditions.

As is shown in FIG. 9, $(b_1)$ and $(b_2)$, in the conventional radio selective calling receiver, intermittent receptions are performed at long time intervals upon moving into the out-of-coverage-zone state regardless of whether the receiver has moved into a radio wave blocking area or moved out of the transmission area. As a result, it becomes impossible to perform in quick the synchrnization establishment again when the receiver returns to the coverage zone from the radio wave blocking area.

In contrast to this, as is understood from FIG. 9, $(a_1)$ and $(a_2)$ in the radio selective calling receiver of this embodiment of the present invention, when the receiver has moved into a radio wave blocking area, intermittent reception is performed at short time intervals at first, thereby enabling to perform a quick synchronization establishment when the receiver returns to the coverage zone from the radio wave blocking area, and is performed at long time intervals after a lapse of the predetermined time period T. When the receiver has moved out of the transmission area, intermittent reception is performed at long time intervals from the beginning. Note that the optimal value of the time period T changes depending on whether a subway or an underground place in a building or the like is assumed as a radio wave blocking area. In this case, for example, the time period T is set to about 30 minutes. In intermittent reception based on the first time intervals, for example, the reception section is kept OFF for about 10 seconds, and is kept ON for about two seconds. In intermittent reception based on the second time intervals, for example, the reception section is kept OFF for 30 seconds, and is kept ON for about two seconds.

As has been described above, when the radio selective calling receiver returns from a radio wave blocking area to the coverage zone, a quick synchronization establishment is required. According to the conventional radio selective calling receiver, since the reception mode is uniformly switched to the intermittent reception mode based on predetermined time intervals upon determination of movement out of the coverage zone, it is difficult to satisfy both the requirements for quick synchronization establishment and a reduction in power consumption.

In contrast to this, according to the present invention, with the use of the above method of switching the time intervals of intermittent reception, when the radio selective calling receiver has moved into a radio wave blocking area, in case a quick synchronization establishment is required when the receiver returns to the coverage zone from the radio wave blocking area, intermittent reception is performed at short intervals regardless of a BS effect for the time T. When the receiver has moved into an area, outside the coverage zone, in which quick synchronization establishment is not required when the receiver returns to the coverage zone (i.e., when the receiver has moved out of the transmission area), intermittent reception is performed at long time intervals. Therefore, the requirement for quick synchronization establishment can be satisfied with the same power consumption as that in the prior art.

Further, referring to FIG. 9, "(a3)" shows the waveform of the reception section power supply ON signal m when it is determined in step 12 that K>X–N, and in this case it is determined that the radio selective calling receiver has moved into a radio wave blocking area as is similar to the above "(a1)", and "(b3)" shows the waveform of the reception section power supply ON signal m in the conventional radio selective calling receiver under the same condition, but it is different from "(b1)" in that ON operation of the reception section 102 must be frequently done to attain a quick synchronization establishment in case the conventional radio selective calling receiver has returned to a transmission area from the radio wave blocking area, because in the conventional radio selective calling receiver, it is impossible to discriminate whether the return to the transmission area is from the out-of-coverage-zone or from the radio wave blocking area.

Still further, referring to FIG. 9, "(a4)" and "(b4)" show the waveform of the reception section power supply ON signal m of the radio selective calling receiver according to the present invention and the conventional one, respectively, when it is determined in step 12 that K≦X–N, and in this case it is determined that the radio selective calling receiver has moved out of the transmission area. As shown in the waveform (b4) in FIG. 9, in the conventional radio selective calling reveiver, in order to perform a quick synchronization establishment, the ON operation of the reception section 102 must be frequently done. For example, if the interval of ON operation of the reseption section 102 in the conventional receiver is 10 seconds and, on the other hand, that of the receiver according to the present invention is 30 seconds, a reduction in power consumption in the radio selective calling receiver becomes 3 times as compared with that in the conventional receiver.

As is clearly understood from the foregoings, according to the present invention, both the requirements for a quick synchronization establishment and a reduction in power consumption can be satisfied.

Referring to FIG. 9, reference symbols f1, f2, . . . are assigned to the respective pulses of the reception section power supply ON signal m. These reference symbols represent the scanning frequencies which are to be detected at the respective timings when the radio selective calling receiver is assumed to be a scanning type receiver. Apparently, in the case of the scanning type receiver, the effect of the above BS control operation is conspicuous.

A frequency scanning operation in a scanning type radio selective calling receiver will be described next as another operation in the present invention.

In the embodiment shown in FIG. 1, it is checked on the basis of the output f from the synchronization monitoring section 108 whether the receiver is inside or outside the coverage zone. The detection history data on sync signals are read out from the output g from the history holding section 109. In accordance with the sync signal detection history data obtained when the receiver moved out of the coverage zone, it is checked whether the reception section 102 has moved into a radio wave blocking area or moved out of the transmission area. On the basis of this determination, a frequency channel instruction is given to the reception section 102, and control of the power supply for the reception section 102, i.e., activation control on the reception section 102, is performed. In this case, a control signal (reception section power supply ON signal) m is used. In addition, the push switch 110 serving as an external input means is operated to cause the reception control section 106 to check, on the basis of the sync signal detection history data obtained when the receiver moved out of the coverage zone, whether the reception section 102 has moved into a radio wave blocking area or moved out of the transmission area. In addition, a setting instruction is given to the reception section 102 to turn on or off the function of performing a frequency scanning operation suitable for either of the above states. This setting result is held in the EEPROM 114 through the reception control section 106.

Figure 10:
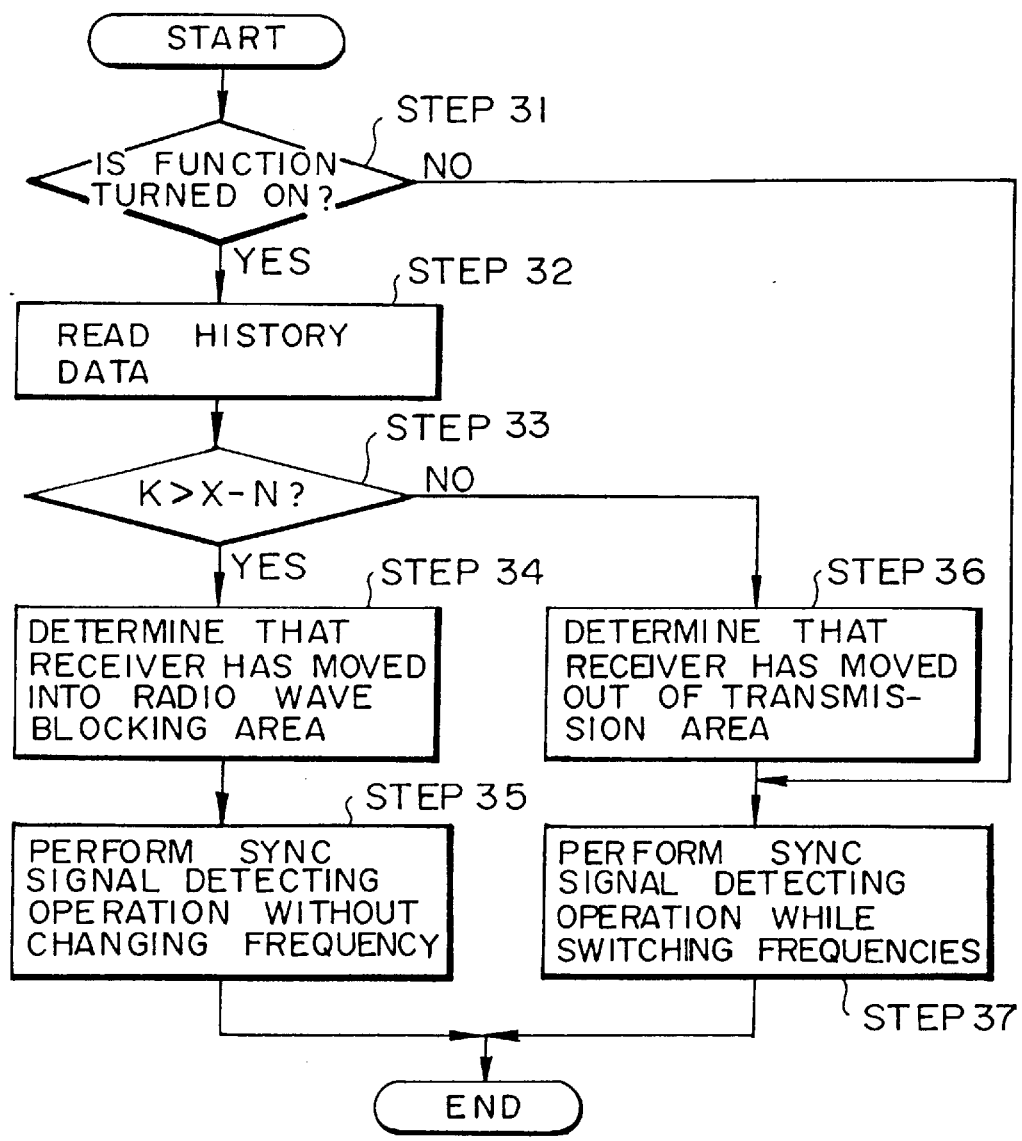
FIG. 10 is a flow chart showing another operation in the embodiment of the present invention.

FIG. 10 is a flow chart showing the operation of the radio selective calling receiver which is to be performed when the synchronization monitoring section 108 detects that the receiver has moved out of the coverage zone. According to this flow chart, first of all, when the reception control section 106 detects, on the basis of an output from the synchronization monitoring section 108, that the self-receiver is outside the coverage zone, the reception control section 106 reads out data from the EEPROM 114, and determines, in accordance with the operation of the push switch 110, whether to turn on or off the function of performing a frequency scanning operation (step 31). When the function is to be turned off, the reception control section 106 unconditionally performs control to detect a sync signal while sequentially switching predetermined frequency channels as in the prior art (step 37). If the function is to be turned on, the reception control section 106 reads out data representing the received state of sync signals, which are received until the out-of-coverage-zone state is established, from the history holding section 109 (step 32).

The reception control section 106 then counts the number of times (X) no sync signal was detected in the detecting operation performed n times in the past, which data is stored in the history holding section 109, calculates X–N, and compares the resultant value with a parameter K which is preset as a criterion for determination of movement out of the coverage zone (step 33). If K>X−N, it is determined that the reception section abruptly stopped receiving sync signals, and hence it is determined that the receiver has temporarily moved into a radio wave blocking area (step 34). In this case, the reception control section 106 performs the above BS control operation for the reception section 102 without switching the frequencies, i.e., using the frequency set immediately before the receiver moved out of the coverage zone (step 35).

Figure 11:
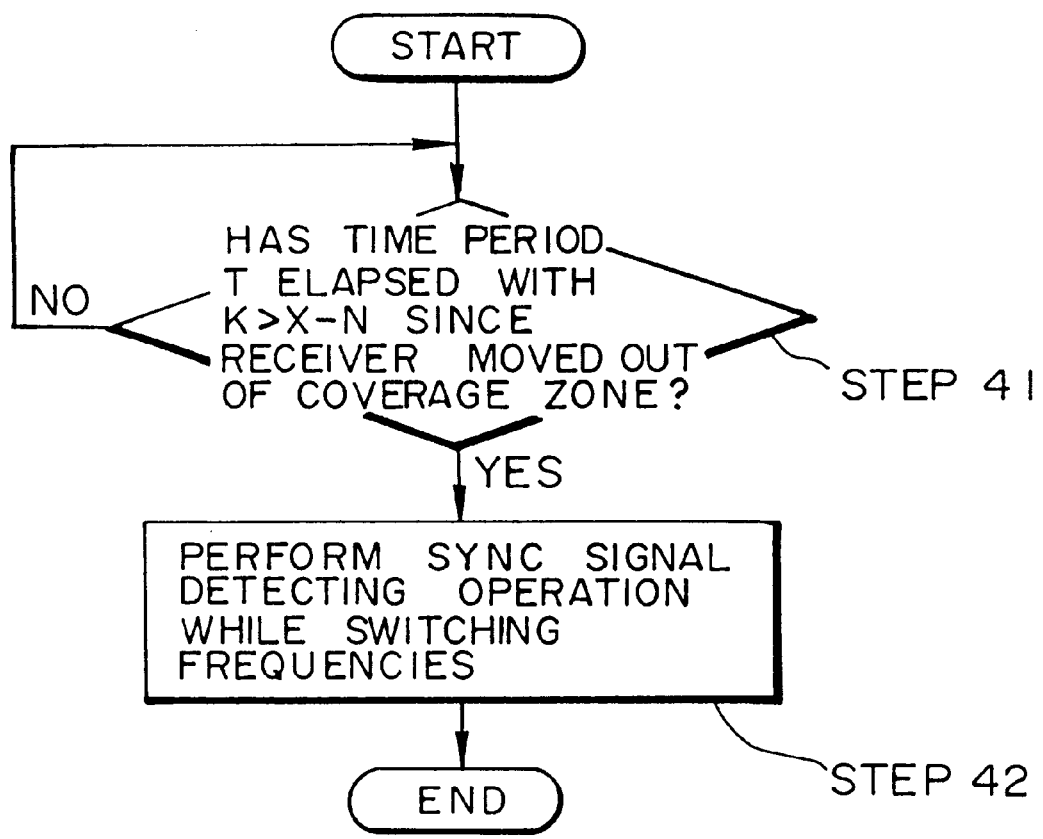
FIG. 11 is a flow chart showing an operation in the embodiment of the present invention which is to be performed after the receiver moves out of a coverage zone.

If it is determined in step 33 that K≦X−N, it is determined that the reception section gradually stopped receiving sync signals, and hence it is determined that the receiver has moved out of the transmission area (step 36). In this case, the reception control section 106 controls the reception section 102 to detect sync signals while sequentially switching the predetermined frequency channels (step 37). FIG. 11 is a flow chart showing an operation to be performed when the time period T has elapsed with a frequency channel being fixed since the receiver moved out of the coverage zone. More specifically, it is checked whether the time period T has elapsed (step 41). If it is determined that the time period T has elapsed, the frequency-fixed mode is stopped, and sync signals are detected while the predetermined frequency channels are sequentially switched (step 42).

Figure 12:
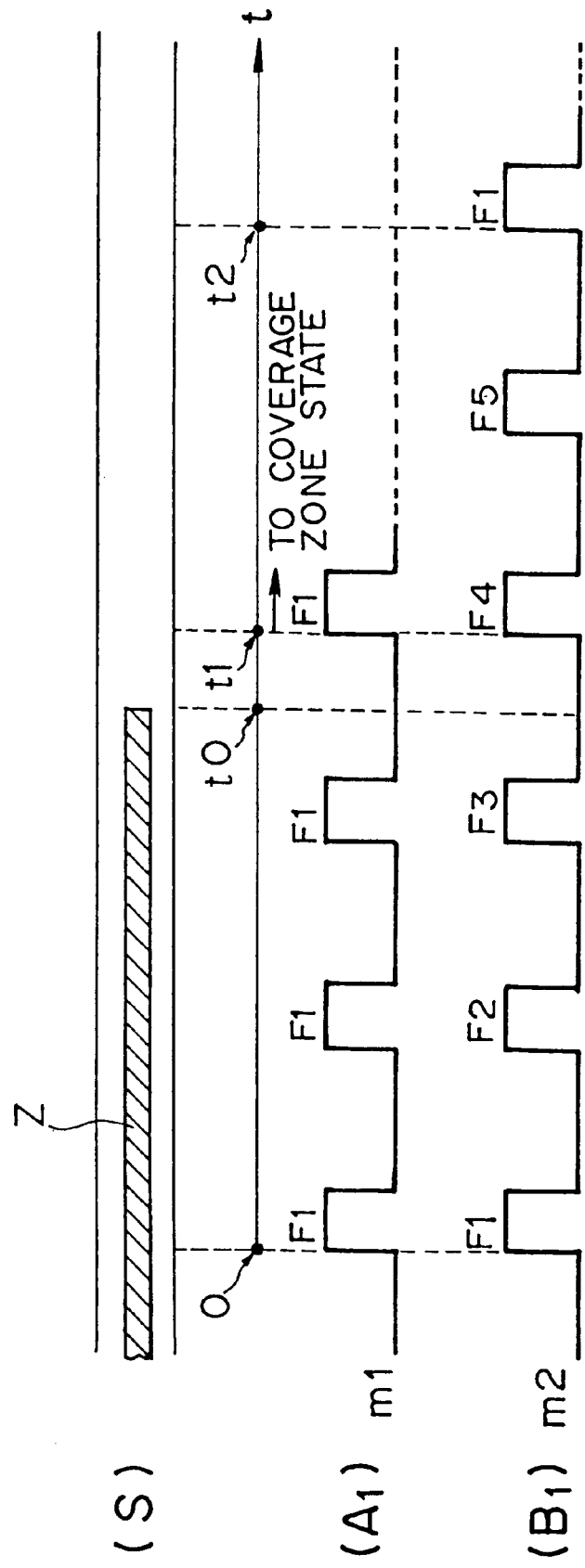
FIGS. 12 to 14 are timing charts of control signals m1 and m2 to be supplied to a reception section in which m1 shows a case of the present invention and, on the other hand, m2 shows the prior art case.

FIG. 12 shows the timings of control signals m1 and m2 output from the reception control section 106 to the reception section 102 and the respective frequencies to be set in the above sync signal detecting operation ($A_1$) for K>X−N and the conventional sync signal detecting operation ($B_1$). In this case, the high-level portions of each signal correspond to the ON states of the reception section 102, indicating that a receiving operation can be performed. In the duration of each low-level portion of each signal, the reception section 102 is kept in the OFF state, i.e., the power saving state. Assume that the time intervals between the high-level portions of the control signals m1 and m2 are set to, e.g., about two seconds. Referring to FIG. 12, the control signal m1 is supplied to the reception section 102 in the present invention from the start of the movement of the receiver out of the coverage zone for K>X−N. The control signal m2 is supplied to the reception section 102 in the prior art from the start of the movement of the receiver out of the coverage zone for K>X−N.

Reference symbols F1 to F5 denote frequency channels to be set in the reception section 102 by the reception control section 106. Referring to FIG. 12, for example, a frequency switching pattern is predetermined such that the frequency channels F1 to F5 are cyclically switched. A hatched portion Z of a radio signal (S) in FIG. 12 represents a state in which the user of the receiver has entered an underground place in a building or the like so radio signals have been blocked and have not reached the receiver. At time t0, the receiver moves out of the radio wave blocking area and enters the signal reception area (coverage zone) again. In the prior art, the receiver cannot shift to the coverage-zone state until the frequency channel F1 takes a turn in the frequency channel order (time t2), i.e., until time t2. In contrast to this, according to the present invention, the receiver can shift to the coverage-zone state at time t1, which is earlier than the time at which the conventional receiver can shift to the coverage-zone state. Establishing the coverage-zone state quickly is important when call signals addressed to the self-receiver in the time interval between time t1 to time t2 are to be received as early as possible. In this case, the BS effect is the same as that in the prior art.

Figure 13:
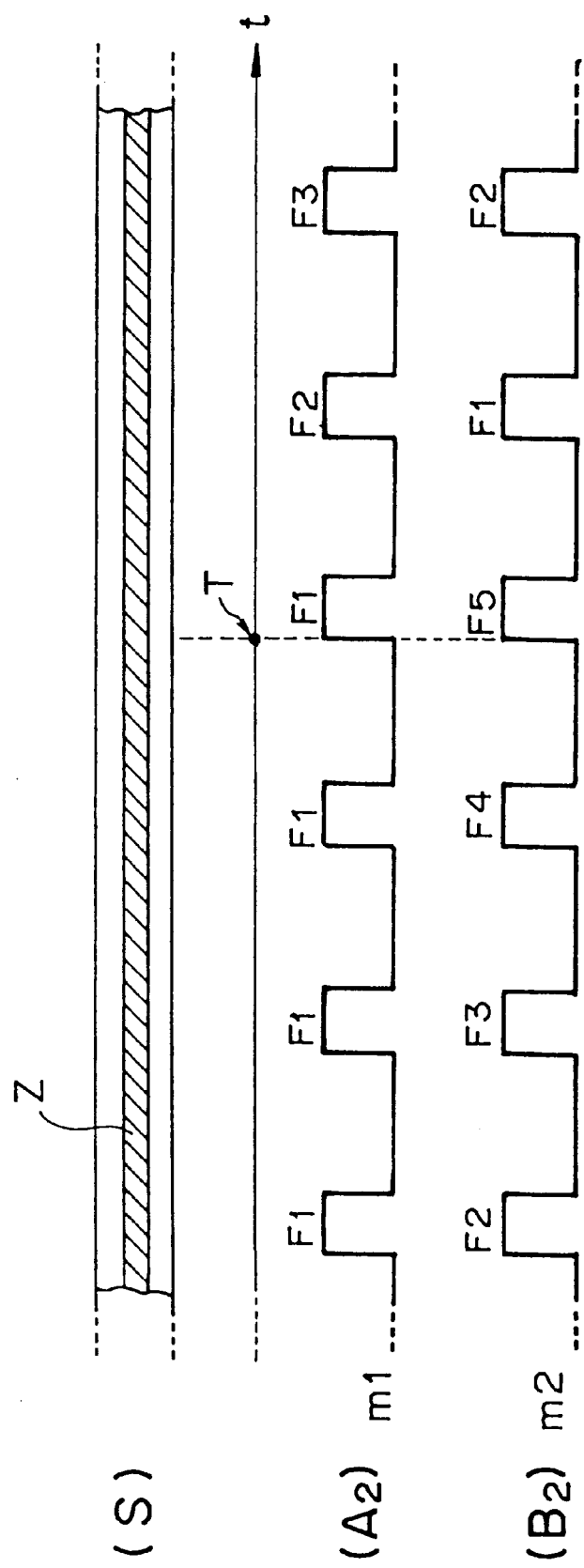

FIG. 13 shows a sync signal detecting operation ($A_2$) for K>X−N in comparison with a conventional operation ($B_2$), and more specifically, the timings of the control signals m1 and m2 output from the reception control section 106 to the reception section 102 and the frequencies to be set before and after a lapse of the time period T since the movement of the receiver out of the coverage zone. In this case, even if K>X−N, sync signal detection is performed in the order of the set frequency channels as in the prior art after a lapse of the time period T since the movement of the receiver out of the coverage zone in consideration of a case in which the user of the receiver moves to another frequency channel area by subway.

Figure 14:
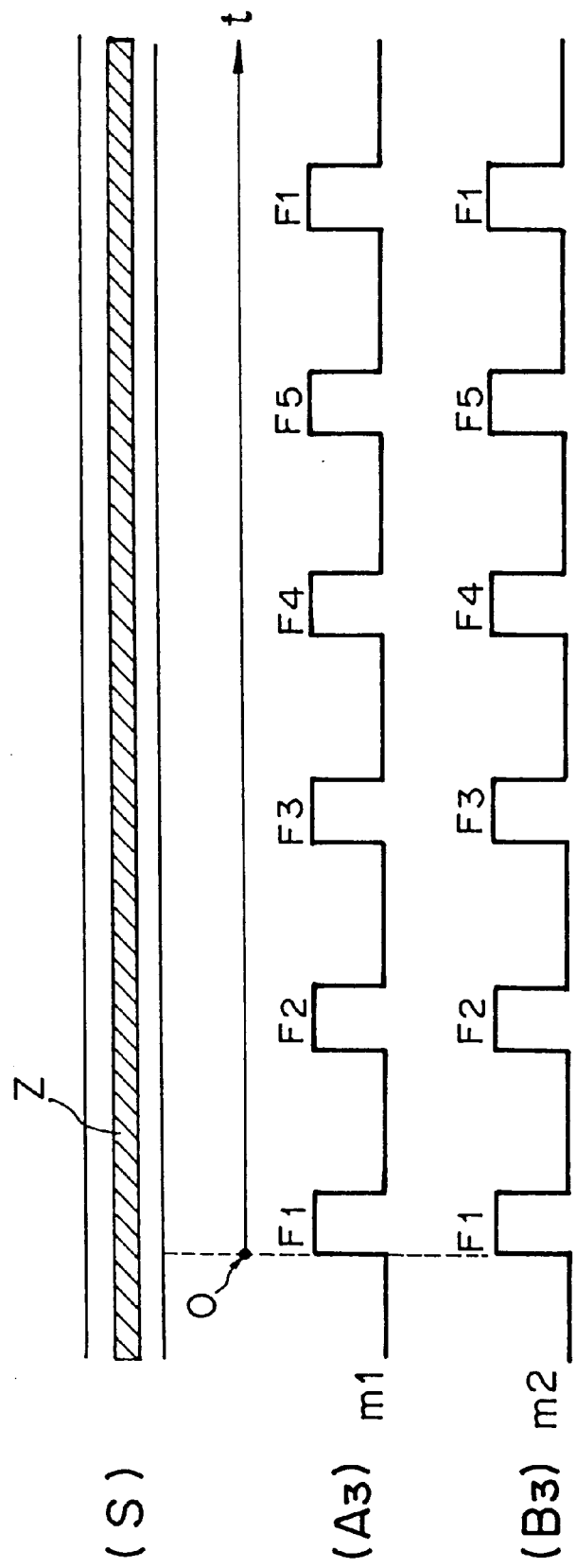

FIG. 14 shows a sync signal detecting operation ($A_3$) in the case of K≦X−N in comparison with a conventional operation ($B_3$), and more specifically, the timings of the control signals m1 and m2 output from the reception control section 106 to the reception section 102 and the respective frequencies to be set. In this case, the control signals m1 and m2 are the same as those in the prior art, and hence the same control as that in the prior art is performed. In this case, since the receiver may move to an area with a frequency channel different from that in the area where the coverage-zone state has been established, sync signals are detected in the order of the frequency channels set in the receiver serving as a multi-area receiver both in the present invention and the prior art.

What is claimed is:

1. A radio selective calling receiver having a function of causing a reception section for receiving a transmitted radio signal to intermittently receive the radio signal by intermittently supplying a reception section power supply ON signal for turning on said reception section, wherein said radio selective calling receiver detects movement of said receiver out of a coverage zone on the basis of data indicating that the radio signal received by said reception section contains no sync signals having a predetermined period, determines a state of movement out of the coverage zone on the basis of a received state of the sync signals within a predetermined period of time in the past until the movement of said receiver out of the coverage zone is detected, and controls time intervals at which the reception section power supply ON signal is supplied to said reception section in accordance with the determined state;

wherein said radio selective calling receiver is a scanning type radio selective calling receiver which is locked to a frequency channel from which the sync signal is detected while a plurality of different predetermined frequency channels are sequentially switched, receives a radio signal subsequently transmitted and constituted by a self-call number and data, and performs a calling/notifying operation;

a reception section for receiving and demodulating the radio signal, said reception section being capable of receiving activation control;

sync signal detection means for detecting a sync signal having a predetermined period and contained in the radio signal from an output signal from said reception section;

out-of-coverage-zone movement monitoring means for detecting on the basis of the sync signal detection signal whether said radio selective calling receiver has moved out of a coverage zone in which the radio signal can be received;

history holding means for holding history data indicating whether the sync signal was detected by said sync signal detection means within the unit number of times said reception section is activated; and a reception control section for, when said out-of-coverage-zone movement monitoring means determines that said radio selective calling receiver has moved out of the coverage zone, searching for the sync signal without switching the frequency channels in an out-of-coverage-zone state, if the number of times the sync signal was not detected is less than a predetermined number of times within the unit number of times said reception section was activated, and searching for the sync signal while performing a predetermined switching operation for the frequency channels, if the number of times the sync signal was not detected is not less than a predetermined number of times.

2. A receiver according to claim 1, wherein said out-of-coverage-zone movement monitoring means determines that said radio selective calling receiver is in the coverage zone, when the sync signal detection signal is output, and determines that said radio selective calling receiver has moved out of the coverage zone, when the sync signal detection signal is not consecutively output a predetermined number of times.

3. A receiver according to claim 1, wherein said reception control section searches for the sync signal without switching the frequency channels for a predetermined period of time when said radio selective calling receiver is outside the coverage zone, and searches for the sync signal while performing a predetermined switching operation for the frequency channels after a lapse of the predetermined period of time.

4. A receiver according to claim 1, further comprising external input means for, when said radio selective calling receiver has moved out of the coverage zone, selectively causing said reception control section to search for the sync signal without switching the frequency channels or to search for the sync signal while performing a predetermined switching operation for the frequency channels in accordance with sync signal detection history data held in said history holding section, and a memory for holding the selection result obtained by said external input means.

5. A radio selective calling receiver comprising:

(a) a reception section to which a power supply ON signal is intermittently supplied and which receives and demodulates a transmitted radio signal;

(b) sync signal detection means for detecting a sync signal having a predetermined period and contained in the radio signal from an output signal from said reception section;

(c) out-of-coverage-zone movement monitoring means for detecting movement of said radio selective calling receiver out of a coverage zone, in which the radio signal can be received, on the basis of a sync signal detection signal generated by said sync signal detection means;

(d) history holding means for holding history data indicating whether a sync signal was detected by said sync signal detection means when the power ON signal was supplied to said reception section a predetermined number of times in the past; and (e) reception control means for controlling time intervals at which the power ON signal is intermittently supplied to said reception section on the basis of the history data held in said history holding means when said out-of-coverage-zone movement monitoring means detects movement of said radio selective calling receiver out of the coverage zone.

6. A receiver according to claim 5, wherein said out-of-coverage-zone movement monitoring means determines that said radio selective calling receiver is in the coverage zone, when the sync signal detection signal is output, and determines that said radio selective calling receiver has moved out of the coverage zone, when the sync signal detection signal is not consecutively output a predetermined number of times.

7. A receiver according to claim 5, wherein said reception control means intermittently supplies the power ON signal at first time intervals when the number of times the sync signal was not detected within a predetermined period of time in the past is less than a predetermined number of times, and intermittently supplies the power ON signal to said reception section at second time intervals longer than the first time intervals when the number of times the sync signal was not detected is not less than the predetermined number of times.

8. A receiver according to claim 7, wherein said reception control means intermittently supplies the power ON signal to said reception section at the first time intervals when said reception control means intermittently supplies the power ON signal to said reception section at the first time intervals for a predetermined period of time after said radio selective calling receiver moves out of the coverage zone.

9. In a radio selective calling receiver having a battery saver that controls an intermittent supply of power to a reception section when the receiver is moving out of a coverage area, the improvement comprising history holding means for storing indications whether a sync signal was received when power was supplied to the reception section a predetermined number of times in the past when the receiver is moving out of a coverage area, and control means for varying a time interval at which power is intermittently supplied to the reception means when the receiver is moving out of the coverage area, based on the indications stored in said history holding means.

10. The improved receiver of claim 9, wherein said control means comprises means for setting a first said time interval when the stored indications indicate that the sync signal was not received more than a threshold number of times and setting a second said time interval when the stored indications indicate that the sync signal was not received less than the threshold number of times, said second time interval being shorter than said first time interval.

11. The improved receiver of claim 10, wherein said threshold is a function of a number of consecutive times a sync signal was not received.

12. The improved receiver of claim 10, wherein the receiver is a frequency scanning receiver which scans plural frequencies except when the second time interval is set.

* * * * *